UNITED STATES PATENT OFFICE.

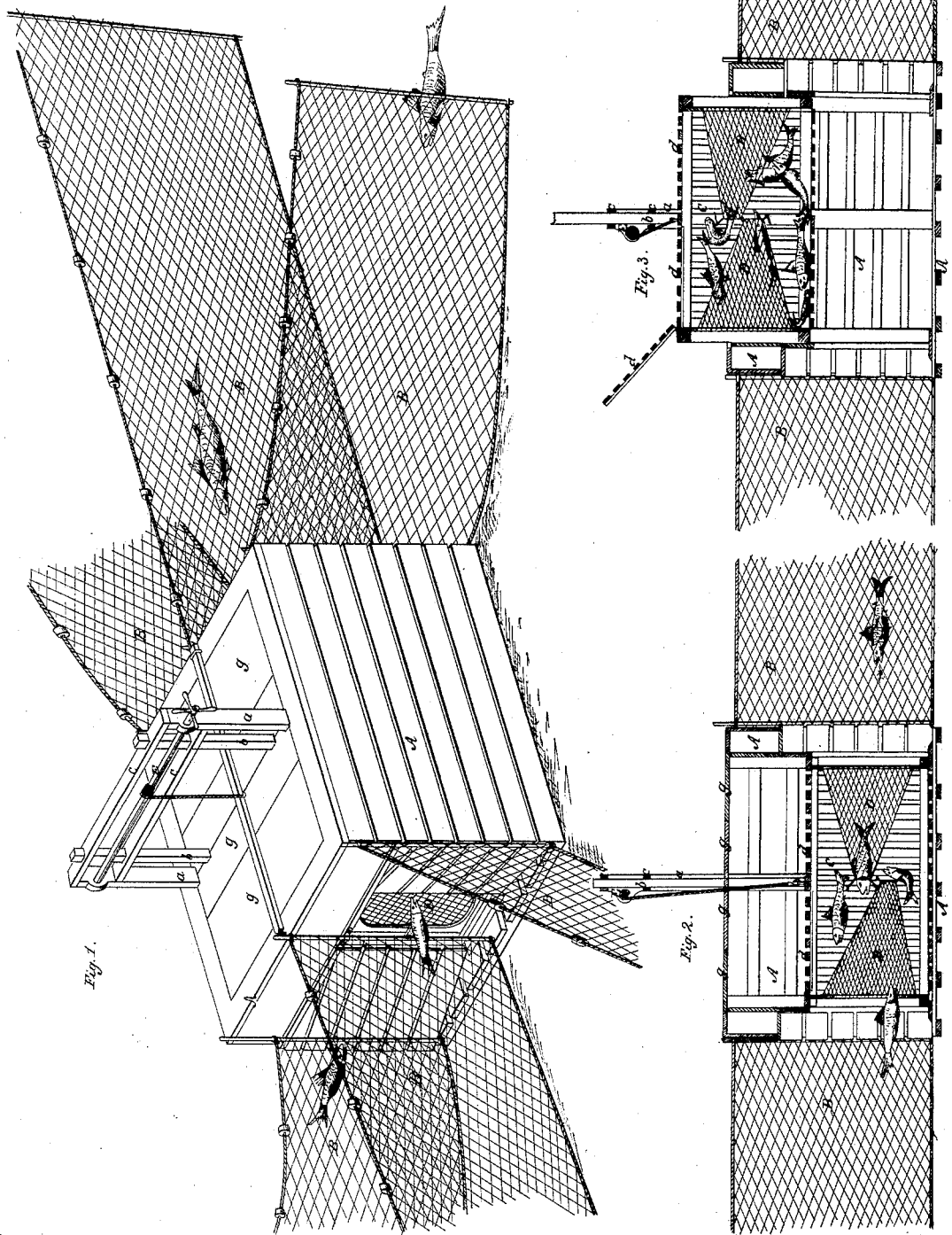

FORMAN GOODWIN, OF ASTORIA, NEW YORK.

IMPROVEMENT IN FISH-TRAPS.

Specification forming part of Letters Patent No. 34,887, dated April 8, 1862.

*To all whom it may concern:*

Be it known that I, F. GOODWIN, of Astoria, in the county of Queens and State of New York, have invented a new and useful Improvement in Fish-Traps; and I do hereby declare that the following is a full, clear, and exact description of the same, reference being had to the accompanying drawings, forming part of this specification, in which—

Figure 1 is a perspective view of my improved trap adjusted for catching fish. Fig. 2 is a vertical longitudinal section of the same. Fig. 3 is a similar longitudinal section, the parts being adjusted to a position for removing the entrapped fish.

Similar letters of reference in each of the several figures indicate corresponding parts.

The nature of my invention consists in the combination of vertically-adjusted seines, outer slatted anchor-boss, inner adjustable slatted fish-receptacle, and funnel-shaped decoy-seines, all substantially as hereinafter described.

To enable others skilled in the art to make and use my invention, I will proceed to describe its construction and operation with reference to the drawings.

A represents a rectangular box formed of slats and with a hollow space between its inner and outer slatted sides. The slats are nailed to uprights, and spaces for the circulation of water through the box exist between them.

The space between the inner and outer slattings is filled with small stones or pebbles, in order to sink the box below the surface of the water in which the fish-trap is placed.

The ends of the box A are partly closed in by means of obliquely-set slatted panels, there only existing between said panels a narrow central inlet for the fish.

To the four corners, and midway of the ends of the box A, seines B B B are adjusted vertically, or nearly so, as necessity may require. The loose ends of the seines have stakes, which enter the bed of the river when the trap is adjusted for catching fish, as shown.

Within the box A a rectangular slatted fish-receptacle, C, is placed. The ends of this receptacle are open, and opposite the openings funnel-shaped decoy-seines D D are arranged, they being attached to the receptacle C at their large ends and sustained by cords at their small ends, said cords also attaching to the receptacle.

The receptacle C is loosely arranged in the box A, and is suspended in the same by means of a windlass, E, mounted on uprights *a a* of the box A, as shown. It also is guided by means of rods *b b*, which fit loosely in holes formed in the cross-pieces *c c* of the uprights.

The box A has a top, *g*, which is made in several pieces and is movable, and the receptacle C has two hinged half-covers, *d*, on its top, which are held down by rods or catches, and can be raised when it is desired to remove fish from the receptacle.

From the drawings and the foregoing description it may be obvious that if the trap is sunk in a place inhabited by fish and the seines adjusted as shown the fish will be arrested by the vertically-adjusted seines, and in their movements will find their way toward the ends of the box A, and in passing farther on will enter the receptacle C through the funnel-shaped decoy-seines D D. The fish having once passed through the decoy-seines they cannot readily find their way back, but, owing to the receptacle being large and the taper ends of the seines D D very small, will remain confined until removed by the fisherman.

In removing the fish captured all that has to be done is to take off top of box A, raise the receptacle C by means of the windlass to the position shown in Fig. 3, and then raise the half lids or covers of the same to the position shown in red. In this position no water remains in the box, and therefore the fish are readily seen and removed.

What I claim as my invention, and desire to secure by Letters Patent, is—

The combination of vertically-adjusted seines B, outer slatted anchor-box, A, inner adjustable slatted fish-receptable, C, and taper decoy-seines D D, substantially as and for the purposes set forth.

F. GOODWIN.

Witnesses:
W. F. MUCHMORE,
J. BURROUGH.